United States Patent
Wu et al.

(10) Patent No.: US 11,078,031 B2
(45) Date of Patent: Aug. 3, 2021

(54) CONVEYING APPARATUS

(71) Applicant: WUHAN YIFI LASER EQUIPMENT CO., LTD., Wuhan (CN)

(72) Inventors: Xuan Wu, Wuhan (CN); Changlin Ran, Wuhan (CN); Zhaojun Luo, Wuhan (CN); Xiongli Wang, Wuhan (CN); Weiming Zeng, Wuhan (CN)

(73) Assignee: WUHAN YIFI LASER EQUIPMENT CO., LTD., Wuhan (CN)

( * ) Notice: Subject to any disclaimer, the term of this patent is extended or adjusted under 35 U.S.C. 154(b) by 0 days.

(21) Appl. No.: 16/643,515

(22) PCT Filed: Feb. 28, 2018

(86) PCT No.: PCT/CN2018/077587
§ 371 (c)(1),
(2) Date: Feb. 28, 2020

(87) PCT Pub. No.: WO2019/144463
PCT Pub. Date: Aug. 1, 2019

(65) Prior Publication Data
US 2020/0255230 A1    Aug. 13, 2020

(30) Foreign Application Priority Data

Jan. 26, 2018 (CN) .......................... 201810077875.X

(51) Int. Cl.
*B65G 47/74* (2006.01)
*B65B 35/24* (2006.01)
(Continued)

(52) U.S. Cl.
CPC .............. *B65G 47/74* (2013.01); *B65B 35/24* (2013.01); *B65G 25/02* (2013.01); *B65G 15/12* (2013.01)

(58) Field of Classification Search
CPC ........ B65G 47/74; B65G 25/02; B65G 15/12; B65B 35/24
(Continued)

(56) References Cited

U.S. PATENT DOCUMENTS

| | | | |
|---|---|---|---|
| 7,281,623 B1 * | 10/2007 | Kitazumi | B65G 17/123 198/461.1 |
| 7,731,015 B2 * | 6/2010 | Abe | B65B 43/52 198/620 |
| 10,081,493 B2 * | 9/2018 | Gunther | B65G 15/14 |

FOREIGN PATENT DOCUMENTS

| | | | |
|---|---|---|---|
| CN | 102976079 A | | 3/2013 |
| CN | 203667425 U | * | 6/2014 |
| CN | 104555396 A | | 4/2015 |
| CN | 204453778 U | | 7/2015 |

(Continued)

OTHER PUBLICATIONS

The International Search Report for PCT Application No. PCT/CN2018/077587 dated Nov. 1, 2018, 6 pages, [English Translation].
(Continued)

*Primary Examiner* — Gene O Crawford
*Assistant Examiner* — Lester Rushin, III
(74) *Attorney, Agent, or Firm* — Womble Bond Dickinson (US) LLP

(57) ABSTRACT

A conveying apparatus, comprising a drive conveying sub-apparatus. The drive conveying sub-apparatus comprises a first movable supporting film (81), a second movable supporting film (82), a first fixed supporting film (71), and a drive conveying mechanism. The first movable supporting film (81) and the second movable supporting film (82) are respectively located at both sides of the first fixed supporting film (71). The first movable supporting film (81) and the second movable supporting film (82) are both slidably connected with the drive conveying mechanism, so that the drive conveying mechanism drives the first movable supporting film (81) and the second movable supporting film
(Continued)

(82) to move up and down and move forward and backward. The first movable supporting film (81), the second movable supporting film (82), and the first fixed supporting film (71) are all provided with grooves having sizes matched with the size of an object to be conveyed. The conveying apparatus can quickly and accurately convey the object to a next station.

9 Claims, 2 Drawing Sheets

(51) Int. Cl.
  *B65G 25/02* (2006.01)
  *B65G 15/12* (2006.01)
(58) Field of Classification Search
  USPC ....................................................... 198/626.1
  See application file for complete search history.

(56) References Cited

FOREIGN PATENT DOCUMENTS

| | | |
|---|---|---|
| CN | 105460584 A | 4/2016 |
| CN | 205364254 U | 7/2016 |
| CN | 106229539 A | 12/2016 |
| CN | 106770370 A | 5/2017 |
| CN | 206318436 U | 7/2017 |
| CN | 206509730 U | 9/2017 |
| CN | 107331899 A | 11/2017 |
| CN | 206634704 U | 11/2017 |
| JP | H07300229 A | 11/1995 |
| WO | 2016052014 A1 | 7/2017 |

OTHER PUBLICATIONS

The Written Opinion of the International Searching Authority for PCT Application No. PCT/CN2018/077587 dated Nov. 1, 2018, 3 pages.

* cited by examiner

CONVEYING APPARATUS

CROSS REFERENCE TO RELATED APPLICATIONS

The present application is a U.S. National Phase Application Under 35 U.S.C. § 371 of International Application No. PCT/CN2018/077587, filed Feb. 28, 2018, which claims priority to Chinese Patent Application No. 201810077875X, filed on Jan. 26, 2018, entitled "Conveying Apparatus", the disclosure of which was incorporated herein by reference in its entirety.

FIELD OF TECHNOLOGY

The present disclosure relates to the field of lithium battery production technologies, and more specifically, to a conveying apparatus.

BACKGROUND

As the country's emphasis on new energy resources, the lithium battery industry, as the leader of the new energy resources, has been developed rapidly in recent years. In the production process of batteries, it is necessary to convey the batteries to various stations for processing.

Currently, the conventional battery conveying mode uses a specialized synchronous belt for conveying. For example, a conveying apparatus includes a first conveying mechanism and a second conveying mechanism. The first conveying mechanism includes a first drive wheel, a first driven wheel, and a first conveyor belt connected with the first drive wheel and the first driven wheel; the second conveying mechanism includes a second drive wheel, a second driven wheel, and a second conveyor belt connected with the second drive wheel and the second driven wheel.

Although the conveying efficiency of the existing conveying apparatus is relatively high, the synchronous belt has a certain flexibility, so that the batteries are prone to displacement during the conveying process, resulting in inaccurate positioning of the batteries at processing stations, and eventually causing waste products and etc.

SUMMARY

In view of the technical problems above, the present disclosure provides a conveying apparatus.

In a first aspect, the present disclosure provides a conveying apparatus, including a drive conveying sub-apparatus; wherein the drive conveying sub-apparatus includes a first movable supporting film, a second movable supporting film, a first fixed supporting film and a drive conveying mechanism; the first movable supporting film and the second movable supporting film are respectively located at both sides of the first fixed supporting film; the first movable supporting film and the second movable supporting film are slidably connected with the drive conveying mechanism, so that the drive conveying mechanism drives the first movable supporting film and the second movable supporting film to move up and down and move forward and backward; the first movable supporting film, the second movable supporting film and the first fixed supporting film are provided with grooves having sizes matched with a size of an object to be conveyed.

In an embodiment of the present disclosure, the drive conveying mechanism includes a first linear sliding table, a first lifting push block, a first lifting wedge block and a first translation slide base; wherein the first translation slide base is located below the first movable supporting film and the second movable supporting film, and one side of the first translation slide base is fixedly connected with the first movable supporting film, and the opposite side of the first translation slide base is fixedly connected with the second movable supporting film; the bottom of the first translation slide base is in contact with a plane in which a longer straight edge of the first lifting wedge block is located, and a slope of the first lifting wedge block is provided opposite to a side surface of the first lifting push block; the first lifting push block is located below the first translation slide base, and a bottom of the first lifting push block is fixed on a slider block of the first linear sliding table.

In an embodiment of the present disclosure, the drive conveying mechanism further includes a second linear sliding table and a translation push base; wherein the translation push base is located below the first movable supporting film and the second movable supporting film; one side of the translation push base is slidably connected with the first movable supporting film, and the opposite side of the translation push base is slidably connected with the second movable supporting film; and the bottom of the translation push base is fixed on a slider block of the second linear sliding table.

In an embodiment of the present disclosure, the conveying apparatus further includes a driven conveying sub-apparatus comprising a third movable supporting film, a fourth movable supporting film, a second fixed supporting film and a driven conveying mechanism; wherein the third movable supporting film and the fourth movable supporting film is respectively located at both sides of the second fixed supporting film; the third movable supporting film and the fourth movable supporting film are slidably connected with the driven conveying mechanism, so that the driven conveying mechanism drives the third movable supporting film and the fourth movable supporting film to move up and down; the driven conveying mechanism is connected with the first lifting push block, the first movable supporting film is connected with the third movable supporting film, the second movable supporting film is connected with the fourth movable supporting film, and the first fixed supporting film is connected with the second fixed supporting film; the third movable supporting film, the fourth movable supporting film and the second fixed supporting film are provided with grooves having sizes matched with the size of the conveyed object.

In an embodiment of the present disclosure, the driven conveying mechanism includes a second lifting push block, a second lifting wedge block and a second translation slide base; the second translation slide base is located below the third movable supporting film and the fourth movable supporting film, and one side of the second translation slide base is fixedly connected with the third movable supporting film, and the opposite side of the second translation slide base is fixedly connected with the fourth movable supporting film; the bottom of the second translation slide base is connected with a plane in which a longer straight edge of the second lifting wedge block is located, and a slope of the second lifting wedge block is provided opposite to one side surface of the second lifting push block; the second lifting push block is located below the second translation slide base, and the opposite side surface of the second lifting push block is connected with a side surface of the first lifting push block through a connecting rod; a gradient of the slope of the second lifting wedge block is consistent with that of the slope of the first lifting wedge block, and a height of the slope of the second lifting wedge block is consistent with that of the slope of the first lifting wedge block.

In an embodiment of the present disclosure, the drive conveying mechanism further includes a first guide rail mounting base provided between the first lifting wedge block and the first translation slide base; wherein the bottom of the first guide rail mounting base is in contact with a plane in which the longer straight edge of the first lifting wedge block is located; both ends of the first guide rail mounting base are respectively connected with a first linear guide rail vertically provided; a second linear guide rail is provided at the top of the first guide rail mounting base, and the second linear guide rail is connected with the bottom of the first translation slide base.

In an embodiment of the present disclosure, the drive conveying mechanism further includes a first roller provided at the top of the first lifting push block; and the driven conveying mechanism further includes a second roller provided at the top of the second lifting push block.

In an embodiment of the present disclosure, the driven conveying mechanism further includes a second guide rail mounting base provided between the second lifting wedge block and the second translation slide base; a bottom of the second guide rail mounting base is in contact with the plane in which the longer straight edge of the second lifting wedge block is located; both ends of the second guide rail mounting base are respectively connected with a third linear guide rail vertically provided; a fourth linear guide rail is provided at the top of the second guide rail mounting base, and the fourth linear guide rail is connected with the second translation slide base.

In an embodiment of the present disclosure, the driven conveying mechanism further includes a third guide rail mounting base provided below the second lifting push block, and a fifth linear guide rail is provided at the top of the third guide rail mounting base; and the fifth linear guide rail is connected with the second lifting push block.

In an embodiment of the present disclosure, the opposite side surface of the second lifting push block is connected with the connecting rod through a floating joint.

By constructing the conveying mechanism with the first movable supporting film, the second movable supporting film and the first fixed supporting film, and by driving the first movable supporting film and the second movable supporting film to move up and down and move forward and backward through the drive conveying mechanism, the conveying apparatus provided by the present disclosure can quickly and accurately convey the conveyed object to a next station.

BRIEF DESCRIPTION OF THE DRAWINGS

In order to more clearly describe the embodiments of the present disclosure or the technical solutions in the prior art, the drawings to be used in describing the embodiments or the prior art will be briefly described below. Obviously, the drawings in the following description are some embodiments of the present disclosure, for those of ordinary skill in the art, other drawings may also be obtained based on these drawings without any creative work.

In drawings, 101—first mounting baseplate; 102—second mounting baseplate; 201—first support frame; 202—second support frame; 203—third support frame; 204—fourth support frame; 31—first linear sliding table; 32—second linear sliding table; 41—first lifting push block; 42—second lifting push block; 51—first roller; 52—second roller; 61—first lifting wedge block; 62—second lifting wedge block; 71—first fixed supporting film; 72—second fixed supporting film; 81—first movable supporting film; 82—second movable supporting film; 83—third movable supporting film; 84—fourth movable supporting film; 91—first linear guide rail; 92—second linear guide rail; 93—third linear guide rail; 94—fourth linear guide rail; 95—fifth linear guide rail; 96—sixth linear guide rail; 10*a*—first movable die connection plate; 10*b*—second movable die connection plate; 11—connection key; 121—first guide rail mounting base; 122—second guide rail mounting base; 123—third guide rail mounting base; 131—first translation slide base; 132—second translation slide base; 14—sliding table mounting bracket; 15—floating joint; 16—connecting rod; 17—translation push base.

DETAILED DESCRIPTION

In order to make the objectives, technical solutions and advantages of the embodiments of the present disclosure clearer, the technical solutions of the embodiments of the present disclosure will be described clearly with reference to the accompanying drawings hereinafter. Obviously, the described embodiments are merely some but not all of the embodiments of the present disclosure. On the basis of the embodiments of the present disclosure, all other embodiments obtained by the person of ordinary skill in the art without creative work shall fall within the protection scope of the present disclosure.

Figure 1:
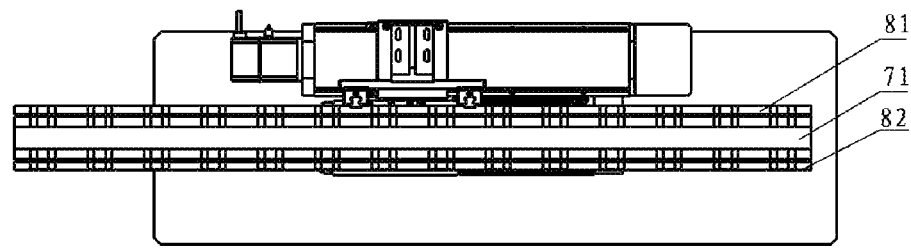
FIG. 1 is a structural schematic diagram of the conveying apparatus provided by an embodiment of the present disclosure.

FIG. 1 is a structural schematic diagram of the conveying apparatus provided by an embodiment of the present disclosure. As shown in FIG. 1, the conveying apparatus includes a drive conveying sub-apparatus. The drive conveying sub-apparatus includes a first movable supporting film 81, a second movable supporting film 82, a first fixed supporting film 71 and a drive conveying mechanism. The first movable supporting film 81 and the second movable supporting film 82 are respectively located at both sides of the first fixed supporting film 71. Grooves having sizes matched with the size of a conveyed object are provided on the first movable supporting film 81, the second movable supporting film 82 and the first fixed supporting film 71. The spaces between the grooves on the first movable supporting film 81 and the grooves on the second movable supporting film 82 are smaller than the length of the conveyed object. The first movable supporting film 81 and the second movable supporting film 82 are both slidably connected with the drive conveying mechanism, so that the drive conveying mechanism drives the first movable supporting film 81 and the second movable supporting film 82 to move, so as to drive the conveyed object to move in a direction perpendicular to the first fixed supporting film 71, and drive the conveyed object to move in a direction parallel to the first fixed supporting film 71.

In an embodiment of the present disclosure, the first movable supporting film 81, the second movable supporting film 82 and the first fixed supporting film 71 are all rigid conveying structures; the first fixed supporting film 71 is fixed, the first movable supporting film 81 and the second movable supporting film 82 can move up and down and move forward and backward relative to the first fixed supporting film 71.

Specifically, the first movable supporting film 81 and the second movable supporting film 82 are provided at both sides of the first fixed supporting film 71, and the first fixed supporting film 71 is fixed, the first movable supporting film 81 and the second movable supporting film 82 can move up and down and move forward and backward relative to the first fixed supporting film 71. For example, the conveyed object to be conveyed by the conveying apparatus is a battery or etc., the grooves on the first movable supporting film 81, the second movable supporting film 82 and the first fixed supporting film 71 have sizes matched with the size of the conveyed object, that is, the grooves on the first movable supporting film 81 and the second movable supporting film 82 have sizes matched with the size of end portion of the conveyed object, and the grooves on the first fixed supporting film 71 have sizes matched with the size of the middle portion of the conveyed object. The spaces between the grooves on the first movable supporting film 81 and the grooves on the second movable supporting film 82 are smaller than the length of the conveyed object, that is, the spaces between the side surface of the first movable supporting film 81 opposite to the first fixed supporting film 71 and the side surface of the second movable supporting film 82 opposite to the first fixed supporting film 71 are smaller than the length of the conveyed object, thereby avoiding drop of the conveyed object.

When the conveying apparatus is in an initial state, the first movable supporting film 81 and the second movable supporting film 82 are in a low position, and the conveyed object is placed in a groove of the first fixed supporting film 71. At this time, the drive conveying mechanism drives the first movable supporting film 81 and the second movable supporting film 82 to move up simultaneously, the first movable supporting film 81 and the second movable supporting film 82 drive the conveyed object to move up, so that the conveyed object leaves the groove of the first fixed supporting film 71, at this time, the conveyed object is located in grooves of the first movable supporting film 81 and the second movable supporting film 82. Then, the drive conveying mechanism drives the first movable supporting film 81 and the second movable supporting film 82 to move forward simultaneously, so that the conveyed object is conveyed from one station to a next station.

In the embodiments of the present disclosure, by constructing a conveying mechanism with the first movable supporting film 81, the second movable supporting film 82 and the first fixed supporting film 71, and by driving the first movable supporting film 81 and the second movable supporting film 82 to move up and down and move forward and backward with the drive conveying mechanism, the conveyed object can be conveyed quickly and accurately to a next station.

In addition, by leaving a certain gap between the first movable supporting film 81 and the first fixed supporting film 71, and by leaving a gap space between the second movable supporting film 82 and the first fixed supporting film 71, the first movable supporting film 81 and the second movable supporting film 82 can move freely without interfering with the first fixed supporting film 71.

Figure 2:
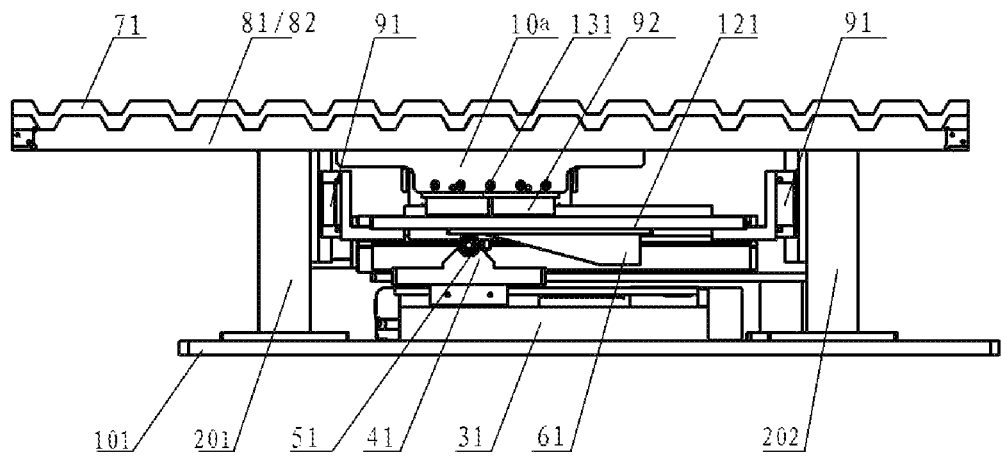
FIG. 2 is a front view of the drive conveying sub-apparatus of the conveying apparatus shown in FIG. 1.

On the basis of the embodiments above, and in combination with FIG. 2, the drive conveying mechanism includes a first linear sliding table 31, a first lifting push block 41, a first lifting wedge block 61 and a first translation slide base 131. The first translation slide base 131 is located below the first movable supporting film 81 and the second movable supporting film 82, and one side of the first translation slide base 131 is fixedly connected with the first movable supporting film 81, and the opposite side of the first translation slide base 131 is fixedly connected with the second movable supporting film 82. The bottom of the first translation slide base 131 is in contact with a plane in which the longer straight edge of the first lifting wedge block 61 is located, and a slope of the first lifting wedge block 61 is provided opposite to a side surface of the first lifting push block 41. The first lifting push block 41 is located below the first translation slide base 131, and the bottom of the first lifting push block 41 is fixed on a slider block of the first linear sliding table 31.

Specifically, the drive conveying mechanism includes the first linear sliding table 31, the first lifting push block 41, the first lifting wedge block 61 and the first translation slide base 131. The first translation slide base 131 is provided below the first movable supporting film 81 and the second movable supporting film 82, and one side of the first translation slide base 131 is fixed to the first movable supporting film 81, and the opposite side of the first translation slide base 131 is fixed to the second movable supporting film 82. For example, both sides of the first translation slide base 131 are respectively connected with a first movable die connection plate 10*a*, and the first movable supporting film 81 and the second movable supporting film 82 are connected with the first movable die connection plate 10*a*. In addition, the first lifting wedge block 61 and the first lifting push block 41 are provided below the first translation slide base 131, and the bottom of the first translation slide base 131 is in contact with the plane in which the longer straight edge of the first lifting wedge block 61 is located, and the side surface of the first lifting push block 41 is provided opposite to the slope of the first lifting wedge block 61, that is, the first lifting wedge block 61 is provided in an inverted manner.

When the conveying apparatus is in an initial position, the slider block of the first linear sliding table 31 is on the left side, therefore when the drive conveying mechanism needs to drive the first movable supporting film 81 and the second movable supporting film 82 to move up, the slider block of the first linear sliding table 31 moves to the right, so as to drive the first lifting push block 41 to move to the right. When the top of the first lifting push block 41 is in contact with the slope of the first lifting wedge block 61, the first lifting wedge block 61 is lifted up by the first lifting push block 41 since the slider block of the first linear sliding table 31 is still driving the first lifting push block 41 to move to the right, i.e., the first lifting push block 41 is moving along the slope of the first lifting wedge block 61. Meanwhile, the first translation slide base 131 is lifted up by the first lifting wedge block 61, and drives the first movable supporting film 81 and the second movable supporting film 82 to move up simultaneously, so that the first movable supporting film 81 and the second movable supporting film 82 drives the conveyed object to move up, and the conveyed object leaves the groove of the first fixed supporting film 71, that is, the conveyed object is located in the grooves of the first movable supporting film 81 and the second movable supporting film 82.

The drive conveying mechanism then drives the first movable supporting film 81 and the second movable supporting film 82 to move forward, so as to convey the conveyed object to the next station. For example, the next station is a blanking position. The slider block of the first linear sliding table 31 then moves to the left, so that the first movable supporting film 81 and the second movable supporting film 82 move to a lower position, while the conveyed object is located in the groove of the first fixed supporting film 71. The drive conveying mechanism then drives the first movable supporting film 81 and the second movable supporting film 82 to move backward to the original position. By reciprocating like this, the precise conveying of the conveyed object is achieved.

Figure 3:
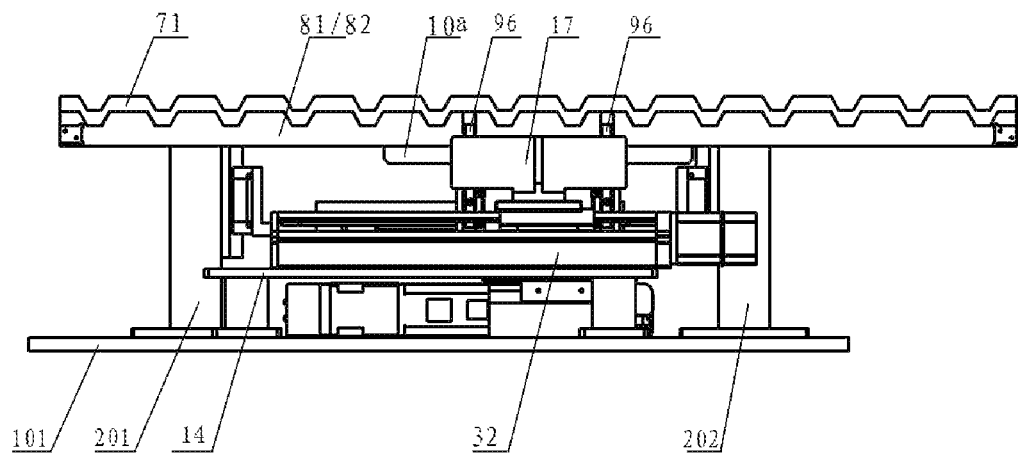
FIG. 3 is a rear view of the drive conveying sub-apparatus of the conveying apparatus shown in FIG. 1.

On the basis of the embodiments above, and in combination with FIG. 3, the drive conveying mechanism further includes a second linear sliding table 32 and a translation push base 17. The translation push base 17 is located below the first movable supporting film 81 and the second movable supporting film 82, and one side of the translation push base 17 is slidably connected with the first movable supporting film 81, and the opposite side of the first translation slide base 131 is slidably connected with the second movable supporting film 82. A bottom of the translation push base 17 is fixed on a slider block of the second linear sliding table 32.

Specifically, the drive conveying mechanism includes the second linear sliding table 32 and the translation push base 17. The translation push base 17 is provided below the first movable supporting film 81 and the second movable supporting film 82, and one side of the translation push base 17 is fixed to the first movable supporting film 81, and the other end of the translation push base 17 is fixed to the second movable supporting film 82. In addition, the second linear sliding table 32 is provided below the translation push base 17. The slider block of the first linear sliding table 13 moves to the right to drive the first movable supporting film 81 and the second movable supporting film 82 to move up, so that the slider block of the second linear sliding table 32 starts to move when the conveyed object is in the grooves of the first movable supporting film 81 and the second movable supporting film 82. For example, when the conveyed object needs to be moved to the left, the original position is that the slider block of the second linear sliding table 32 is on the right side. The slider block of the second linear sliding table 32 moves to the left so drive the translation push base 17 to move to the left, so that the translation push base 17 drives the first movable supporting film 81 and the second movable supporting film 82 to move to the left, thereby achieving the purpose of conveying the conveyed object to the left. When the conveyed object is moved to the left to the next station, the slider block of the first linear sliding table 31 moves to the left, so that the first movable supporting film 81 and the second movable supporting film 82 move to a lower position, while the conveyed object is located in the groove of the first fixed supporting film 71. The slider block of the first linear sliding table 32 then moves to the right, so that the first movable supporting film 81 and the second movable supporting film 82 move to the right to the original position. By reciprocating like this, the precise conveying of the conveyed object is achieved.

Figure 4:
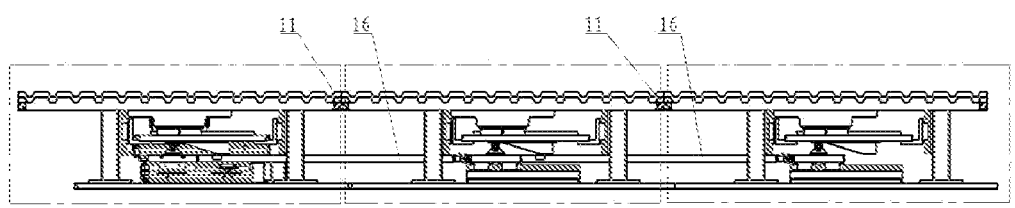
FIG. 4 is a structural schematic diagram of the conveying apparatus provided by another embodiment of the present disclosure.

On the basis of the embodiments above, and in combination with FIG. 4, the conveying apparatus further includes a driven conveying sub-apparatus. The driven conveying sub-apparatus includes a third movable supporting film 83, a fourth movable supporting film 84, a second fixed supporting film 72, and a driven conveying mechanism. The third movable supporting film 83 and the fourth movable supporting film 84 are respectively located at both sides of the second fixed supporting film 72. The third movable supporting film 83 and the fourth movable supporting film 84 are both slidably connected with the driven conveying mechanism, so that the driven conveying mechanism drives the third movable supporting film 83 and the fourth movable supporting film 84 to move horizontally. The driven conveying mechanism is connected with the first lifting push block 41, the first movable supporting film 81 is connected with the third movable supporting film 83, the second movable supporting film 82 is connected with the fourth movable supporting film 84, and the first fixed supporting film 71 is connected with the second fixed supporting film 72. The third movable supporting film 83, the fourth movable supporting film 84 and the second fixed supporting film 82 are all provided with grooves having sizes matched with the size of the conveyed object.

Specifically, on the basis of the drive conveying sub-apparatus, the conveying apparatus further includes the driven conveying sub-apparatus including the third movable supporting film 83, the fourth movable supporting film 84, the second fixed supporting film 72 and the driven conveying mechanism. The third movable supporting film 83 and the fourth movable supporting film 84 are located at both sides of the second fixed supporting film 72. The third movable supporting film 83 and the fourth movable supporting film 84 are moveable back and forth, and the second fixed supporting film 72 is fixed. The grooves on the third movable supporting film 83, the fourth movable supporting film 84 and the second fixed supporting film 72 have sizes matched with the size of the conveyed object, that is, the grooves on the third movable supporting film 83 and the fourth movable supporting film 84 have sizes matched with the size of the end portion of the conveyed object, and the grooves on the second fixed supporting film 72 have sizes matched with the size of the middle portion of the conveyed object.

When the first linear sliding table 31 of the drive conveying mechanism drives the first lifting push block 41 to move to the right, the drive conveying mechanism also drives the driven conveying mechanism to move since the driven conveying mechanism is connected with the first lifting push block 41, so that the driven conveying mechanism drives the third movable supporting film 83 and the fourth movable supporting film 84 to move up, that is, the first movable supporting film 81, the second movable supporting film 82, the third movable supporting film 83 and the fourth movable supporting film 84 are lifted simultaneously. At this time, the conveyed object on the drive conveying mechanism leaves the groove on the first fixed supporting film 71, and the conveyed object on the driven conveying mechanism leaves the groove on the second fixed supporting film 72, that is, the conveyed object on the drive conveying mechanism is in the grooves of the first movable supporting film 81 and the second movable supporting film 82, and the conveyed object of the driven conveying mechanism is in the grooves of the third movable supporting film 83 and the fourth movable supporting film. In addition, a plurality of grooves can be provided on the first movable supporting film 81, the second movable supporting film 82, the first fixed supporting film 71, the third movable supporting film 83, the fourth movable supporting film 84 and the second fixed supporting film 72 as needed, and the spaces between the grooves can be determined by the size of the conveyed object.

The sliding table of the second linear sliding table 32 then drives the translation push base 17 to move, so that the translation push base 17 drives the first movable supporting film 81 and the second movable supporting film 82 to move forward. Since the third movable supporting film 83 is connected with the first movable supporting film 81, and the fourth movable supporting film 84 is connected with the second movable supporting film 82, for example, the third movable supporting film 83 and the first movable supporting film 81, the fourth movable supporting film 84 and the second movable supporting film 82 are connected through connection keys such as taper keys, square keys and etc., when the translation push base 17 drives the first movable supporting film 81 and the second movable supporting film 82 to move forward, the third movable supporting film 83 and the fourth movable supporting film 84 also move forward, so that the conveyed object on the drive conveying mechanism and the conveyed object on the driven conveying mechanism are conveyed to the next station.

In the embodiments of the present disclosure, in combination with the driven conveying sub-apparatus on the basis of the drive conveying sub-apparatus, the structure of the entire conveying apparatus is more complete, and more conveyed objects can be conveyed. Meanwhile, different conveyed objects also can be conveyed simultaneously, thereby making the functions of the entire conveying apparatus to be more comprehensive.

In addition, a certain gap is provided between the third movable supporting film 83 and the second fixed supporting film 72, and a certain gap is provided between the fourth movable supporting film 84 and the second fixed supporting film 72, so that the third movable supporting film 83 and the fourth movable supporting film 84 do not interfere with the second fixed supporting film 72 when moving freely.

Figure 5:
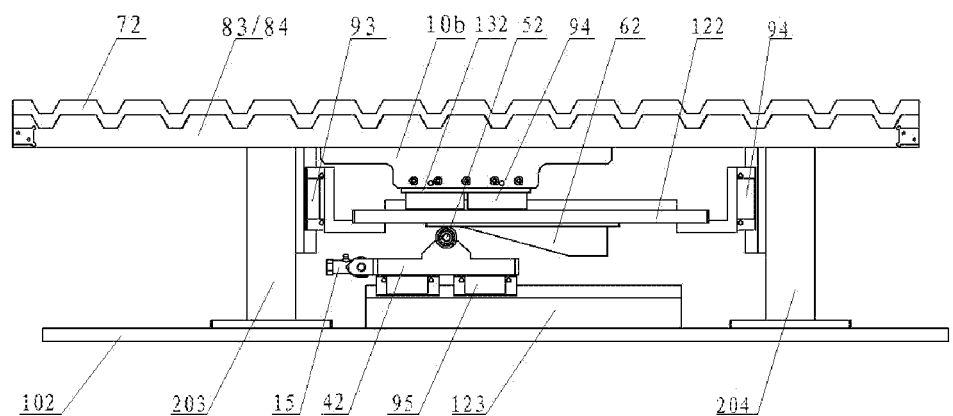
FIG. 5 is a structural schematic diagram of the driven conveying sub-apparatus of the conveying apparatus shown in FIG. 4.

On the basis of the embodiments above, and in combination with FIG. 5, the driven conveying mechanism includes a second lifting push block 42, a second lifting wedge block 62 and a second translation slide base 132. The second translation slide base 132 is located below the third movable supporting film 83 and the fourth movable supporting film 84, and one side of the second translation slide base 132 is fixedly connected with the third movable supporting film 83, and the opposite side of the second translation slide base 132 is fixedly connected with the fourth movable supporting film 84. The bottom of the second translation slide base 132 is connected with a plane in which the longer straight edge of the second lifting wedge block 62 is located, and a slope of the second lifting wedge block 62 is provided opposite to a side surface of the second lifting push block 42. The second lifting push block 42 is located below the second translation slide base 132, and the opposite side surface of the second lifting push block 42 is connected with the side surface of the first lifting push block 41 through a connecting rod 16. The gradient of the slope of the second lifting wedge block 62 is consistent with that of the slope of the first lifting wedge block 61, and the height of the slope of the second lifting wedge block 62 is consistent with that of the slope of the first lifting wedge block 61.

Specifically, the driven conveying mechanism includes the second lifting push block 42, the second lifting wedge block 62 and the second translation slide base 132. The second translation slide base 132 is provided below the third movable supporting film 83 and the fourth movable supporting film 84, and one side of the second translation slide base 132 is fixed to the third movable supporting film 83, and the opposite side of the second translation slide base 132 is fixed to the fourth movable supporting film 84. For example, both sides of the second translation slide base 132 are respectively connected with a second movable die connection plate 10b, and the third movable supporting film 83 and the fourth movable supporting film 84 are connected with the second movable die connection plate 10b. In addition, the second lifting wedge block 62 and the second lifting push block 42 are provided below the second translation slide base 132, and the bottom of the second translation slide base 132 is in contact with the plane in which the longer straight edge of the second lifting wedge block 62 is located, and the side surface of the second lifting push block 42 is provided opposite to the slope of the second lifting wedge block 62, that is, the second lifting wedge block 62 is provided in an inverted manner.

When the conveying apparatus is in the initial position, the second lifting push block 42 is on the left side. When the slider block of the first linear sliding table 31 moves to the right so as to drive the first lifting push block 41 to move to the right, the second lifting push block 42 is also moved to the right since the first lifting push block 41 is connected with the second lifting push block 42. When the top of the second lifting push block 42 is in contact with the slope of the second lifting wedge block 62, since the slider block of the first linear sliding table 31 is still driving the first lifting push block 41 to move to the right, i.e., the second lifting push block 42 is moving along the slope of the second lifting wedge block 62, the second lifting wedge block 62 is lifted up by the second lifting push block 42, so that the second translation slide base 132 is lifted up by the second lifting wedge block 62, and the second translation slide base 132 drives the third movable supporting film 83 and the fourth movable supporting film 84 to move up simultaneously, so that the third movable supporting film 83 and the fourth movable supporting film 84 drives the conveyed object to move up, and the conveyed object leaves the groove of the second fixed supporting film 72, that is, the conveyed object is in the grooves of the third movable supporting film 83 and the fourth movable supporting film 84.

Meanwhile, during the first lifting push block 41 moving to the right, the top of the first lifting push block 41 is in contact with the slope of the first lifting wedge block 61, since the slider block of the first linear sliding table 31 is still drive the first lifting push block 41 to move wedge block 61, the first lifting wedge block 61 is lifted up by the first lifting push block 41, so that the first translation slide base 131 is lifted up by the first lifting wedge block 61, and the first translation slide base 131 drives the first movable supporting film 81 and the second movable supporting film 82 to move up simultaneously, so that the first movable supporting film 81 and the second movable supporting film 82 drives the conveyed object to move up, and the conveyed object leaves the groove of the first fixed supporting film 71, that is, the conveyed object is in the grooves of the first movable supporting film 81 and the second movable supporting film 82.

The sliding table of the second linear sliding table 32 then drives the translation push base 17 to move, so that the translation push base 17 drives the first movable supporting film 81 and the second movable supporting film 82 to move forward. Since the third movable supporting film 83 and the first movable supporting film 81, the fourth movable supporting film 84 and the second movable supporting film 82 are connected through connection keys such as taper keys, square keys and etc., when the translation push base 17 drives the first movable supporting film 81 and the second movable supporting film 82 to move forward, the third movable supporting film 83 and the fourth movable supporting film 84 also move forward, so that the conveyed object on the drive conveying mechanism and the conveyed object on the driven conveying mechanism are conveyed to the next station.

The slider block of the first linear sliding table 31 then moves to the left so that the first lifting push block 41 also moves to the left while diving the second lifting push block 42 to move to left. Therefore, the first lifting wedge block 61 and the second lifting wedge block 62 moves downward so that the first movable supporting film 81 and the second movable supporting film 82 move downward to the lower position, and the third movable supporting film 83 and the fourth movable supporting film 84 move downward to the lower position. At this time, the conveyed object on the drive conveying mechanism is in the groove on the first fixed supporting film 71, and the conveyed object on the driven conveying mechanism is in the groove of the second fixed supporting film 72. The slider block of the second linear sliding table 32 then moves reversely, so that the first movable supporting film 81, the second movable supporting film 82, the third movable supporting film 83 and the fourth movable supporting film 84 move reversely to the original position. By reciprocating like this, the precise conveying of the conveyed object is achieved.

In the embodiments of the present disclosure, by means of the cooperation of the first movable supporting film, the second movable supporting film, the third movable supporting film, the fourth movable supporting film, the first fixed supporting film and the second fixed supporting film, the precise conveying of the conveyed object is achieved, and the stability and accuracy of the entire conveying apparatus are provided.

Based on the various embodiments above, the drive conveying mechanism further includes a first guide rail mounting base 121 provided between the first lifting wedge block 61 and the first translation slide base 131. A bottom of the first guide rail mounting base 121 is in contact with the plane in which the longer straight edge of the first lifting wedge block 61 is located. Two ends of the first guide rail mounting base 121 are respectively connected with a first linear guide rail 91 vertically provided. A second linear guide rail 92 is provided at the top of the first guide rail mounting base 121, and the second linear guide rail 92 is connected with the bottom of the first translation slide base 131.

Specifically, in combination with FIG. 2, the first guide rail mounting base 121 is provided between the first lifting wedge block 61 and the first translation slide base 131, and both ends of the first guide rail mounting base 121 are respectively connected with the first linear guide rail 91, and the second linear guide rail 92 is provided at the top of the first guide rail mounting base 121, and the second linear guide rail 92 is connected with the first translation slide base 131. Therefore, when the first lifting push block 41 drives the first lifting wedge block 61 to move up and down, that is, when the first lifting push block 41 drives the first movable supporting film 81 and the second movable supporting film 82 to move up and down, both ends of the first guide rail mounting base 121 move up and down along the first linear guide rails 91. Due to the action of the first linear guide rails 91, the direction and distance along which the first guide rail mounting base 121 to moves up and down are precise, so that the directions and distances along which the first movable supporting film 81 and the second movable supporting film 82 move up and down are also precise.

Similarly, since the second linear guide rail 92 is connected with the first translation slide base 131, when the translation push base 17 drives the first movable supporting film 81 and the second movable supporting film 82 to move forward and backward, the first translation slide base 131 also moves forward and backward along the second linear guide rail 92. Due to the action of the second linear guide rail 92, the direction and distance along which the first translation slide base 131 moves forward and backward are precise, so that the directions and distances along which the first movable supporting film 81 and the second movable supporting film 82 move forward and backward are also precise.

In the embodiments of the present disclosure, by providing the first guide rail mounting base between the first lifting wedge block and the first translation slide base, providing the first linear guide rails on both sides of the first guide rail mounting base, and providing the second linear guide rail at the bottom of the first translation slide base, the directions and distances along which the first movable supporting film and the second movable supporting film move up and down and moving forward and backward are precise, the precision of the entire conveying apparatus is improved, so that the conveyed object is conveyed to the next station precisely.

In addition, sixth linear guide rail 96 may also be provided between the first movable die connection plate 10*a* and the translation push base 17. Therefore, when the first linear sliding table 31 drives the first movable supporting film 81 and the second movable supporting film 82 to move up and down, the first movable supporting film 81 and the second movable supporting film 82 can move up and down along the sixth linear guide rail 96. Then, the translation push base 17 drives the sixth linear guide rail 96, the first movable die connection plate 10*a*, the first movable supporting film 81 and the second movable supporting film 82 to move forward and backward together. In combination with the sixth linear guide rails 96 on the basis of the first linear guide rail 91, the directions and distances along which the first movable supporting film 81 and the second movable supporting film 82 move up and down are precise.

Based on the various embodiments above, the drive conveying mechanism further includes a first roller 51 provided at the top of the first lifting push block; and the driven conveying mechanism further includes a second roller 52 provided at the top of the second lifting push block. The opposite side surface of the second lifting push block 42 is connected with the connecting rod 16 through a floating joint 15.

Specifically, the first roller 51 is provided at the top of the first lifting push block 41, the first roller 51 is in contact with the first lifting wedge block 61 when the first linear sliding table 31 drives the first lifting wedge block 41 to move to the right to be close to the first lifting wedge block 61. Therefore, by lifting the first lifting wedge block 61 through the first roller 51, the first lifting wedge block 61 can be lifted quickly since the friction between the first roller 51 and the first lifting wedge block 61 is small, so that the first movable supporting film 81 and second movable supporting film 82 are lifted quickly.

In addition, the second roller 52 is provided at the top of the second lifting push block 42, the second lifting push block 42 is also moved to the right when the first linear sliding table 31 drives the first lifting push block 41 to move to the right, since the second lifting push block 42 is connected with the first lifting push block 41. When the second lifting push block 42 moves to be close to the second lifting wedge block 62, the second roller 52 is in contact with the second lifting wedge block 62, and the second lifting wedge block 62 is lifted by the second roller 52. Since the friction between the second roller 52 and the second lifting wedge block 62 is small, the second lifting wedge block 62 can be lifted quickly, so that the third movable supporting film 83 and fourth movable supporting film 84 are lifted quickly. The opposite side surface of the second lifting push block 42 is connected with the connecting rod 16 though the floating joint 15, the case that the second lifting push block 42 is stuck when being connected with the connecting rod 16 is avoided, thereby improving the reliability of the entire conveying apparatus.

In the embodiments of the present disclosure, by providing the first roller at the top of the first lifting push block and providing the second roller at the top of the second lifting push block, the first lifting push block can quickly lift the first movable supporting film and the second movable supporting film, and drive the second lifting push block to lift the third movable supporting film and the fourth movable supporting film quickly, and thus the efficiency of the entire conveying apparatus is improved.

Based on the various embodiments above, the driven conveying mechanism further includes a second guide rail mounting base 122 provided between the second lifting wedge block 62 and the second translation slide base 132. The bottom of the second guide rail mounting base 122 is in contact with the plane in which the longer straight edge of the second lifting wedge block 62 is located. Both ends of the second guide rail mounting base 122 are respectively connected with a third linear guide rail 93 vertically provided. A fourth linear guide rail 94 is provided at the top of the second guide rail mounting base 122, and the fourth linear guide rail 94 is connected with the second translation slide base 132.

Specifically, in combination with FIG. 5, the second guide rail mounting base 122 is provided between the second lifting wedge block 62 and the second translation slide base 132, and both ends of the second guide rail mounting base 122 are respectively connected with the second linear guide rail 93, and the fourth linear guide rail 94 is provided at the top of the second guide rail mounting base 122, and the fourth linear guide rail 94 is connected with the second translation slide base 132. Therefore, when the second lifting push block 42 drives the second lifting wedge block 62 to move up and down, that is, when the second lifting push block 42 drives the third movable supporting film 83 and the fourth movable supporting film 84 to move up and down, both ends of the second guide rail mounting base 122 also move up and down along the third linear guide rails 93. Due to the action of the third linear guide rails 93, the direction and distance along which the second guide rail mounting base 122 moves up and down are precise, so that the directions and distances along which the third movable supporting film 83 and the fourth movable supporting film 84 move up and down are also precise.

Similarly, since the fourth linear guide rail 94 is connected with the second translation slide base 132, the second translation slide base 132 also moves forward and backward along the fourth linear guide rail 94 when the translation push base 17 drives the third movable supporting film 83 and the fourth movable supporting film 84 to move forward and backward. Due to the action of the fourth linear guide rail 94, the direction and distance along which the second translation slide base 132 moves forward and backward are precise, so that the directions and distances along which the third movable supporting film 83 and the fourth movable supporting film 84 move forward and backward are also precise.

In the embodiments of the present disclosure, by providing the second guide rail mounting base between the second lifting wedge block and the second translation slide base, providing the third linear guide rails on both sides of the second guide rail mounting base, and providing the fourth linear guide rail at the bottom of the second translation slide base, the directions and distances along which the third movable supporting film and the fourth movable supporting film move up and down and moving forward and backward are precise, the precision of the entire conveying apparatus is improved, and thus the conveyed object is conveyed to the next work station precisely.

Based on the various embodiments above, the driven conveying mechanism further includes a third guide rail mounting base 122 provided below the second lifting push block 42, and a fifth linear guide rail 95 is provided at the top of the third guide rail mounting base 122. The fifth linear guide rail 95 is connected with the second lifting push block 42.

Specifically, and in combination with FIG. 5, the third guide rail mounting base 122 is provided below the second lifting push block 42, the fifth linear guide rail 95 is mounted on the third guide rail mounting base 122, and the bottom of the second lifting push block 42 is connected with the fifth linear guide rail 95. When the first linear sliding table 31 drives the first lifting push block 41 to move to the left and right, the second lifting push block 42 is also moved to the left and right since the first lifting push block 41 is connected with the second lifting push block 42. Due to the action of the fifth linear guide rail 95, the direction and distance along which the second lifting push block 42 moves to the left and right are precise, so that the directions and distances along which the third movable supporting film 83 and the fourth movable supporting film 84 move up and down are also precise.

In the embodiments of the present disclosure, by providing the third guide rail mounting base 122 under the second lifting push block 42, providing the fifth linear guide rail 95 on the third guide rail mounting base 122 and connecting the fifth linear guide rail 95 to the second lifting push block 42, the direction and distance along which the second lifting push block 42 move up and down are precise, the precision of the entire conveying apparatus is improved, and thus the conveyed object is conveyed to the next station precisely.

In addition, a first mounting baseplate 101 can be provided below the first movable supporting film and the second movable supporting film, and a first support frame 201 and a second support frame 202 are respectively fixed at both ends of the first mounting baseplate 101. The first support frame 201 and the second support frame 202 can be configured to fixedly support the first fixed supporting film 71. The first linear sliding table 31 may also be fixed on the first mounting baseplate 101, and a sliding table mounting bracket 14 of the second linear sliding table 32 may be also fixed on the first mounting baseplate 101.

In addition, a second mounting baseplate 102 can be provided below the third movable supporting film and the fourth movable supporting film, and a third support frame 203 and a fourth support frame 204 are respectively fixed at both ends of the second mounting baseplate 102. The third support frame 203 and the fourth support frame 204 can be configured to fixedly support the second fixed supporting film 72. The third guide rail mounting base 123 may be also fixed on the first mounting baseplate 101.

Finally, it should be noted that the embodiments above are only used to illustrate rather than to limit the technical solutions of the present disclosure; although the present disclosure has been described in detail with reference to the foregoing embodiments, those of ordinary skills in the art should understand that they can still modify the technical solutions described in the foregoing embodiments, or equivalently replace some of the technical features therein; and these modifications or replacements do not separate the essence of the corresponding technical solutions from the spirit and scope of the technical solutions of each of the embodiments of the present disclosure.

What is claimed is:

1. A conveying apparatus, comprising a drive conveying sub-apparatus;
    the drive conveying sub-apparatus includes a first movable supporting film, a second movable supporting film, a first fixed supporting film and a drive conveying mechanism;
    the first movable supporting film and the second movable supporting film are respectively located at both sides of the first fixed supporting film; the first movable supporting film, the second movable supporting film and the first fixed supporting film are provided with grooves having sizes matched with a size of an object to be conveyed;
    spaces between the grooves on the first movable supporting film and the grooves on the second movable supporting film are smaller than a length of the object;
    the first movable supporting film and the second movable supporting film is slidably connected with the drive conveying mechanism, so that the drive conveying mechanism drives the first movable supporting film and the second movable supporting film to move, so as to drive the object to move in a direction perpendicular to the first fixed supporting film, and drive the object to move in a direction parallel to the first fixed supporting film;
    wherein the drive conveying mechanism includes a first linear sliding table, a first lifting push block, a first lifting wedge block and a first translation slide base;
    the first translation slide base is located below the first movable supporting film and the second movable supporting film, and one side of the first translation slide base is fixedly connected with the first movable supporting film, and the opposite side of the first translation slide base is fixedly connected with the second movable supporting film;
    the bottom of the first translation slide base is in contact with a plane in which a longer straight edge of the first lifting wedge block is located, and a slope of the first lifting wedge block is provided opposite to a side surface of the first lifting push block; and
    the first lifting push block is located below the first translation slide base, and the bottom of the first lifting push block is fixed on a slider block of the first linear sliding table.

2. The conveying apparatus of claim 1, wherein the drive conveying mechanism further includes a second linear sliding table and a translation push base;
    wherein the translation push base is located below the first movable supporting film and the second movable supporting film; one side of the translation push base is slidably connected with the first movable supporting film, and the opposite side of the translation push base is slidably connected with the second movable supporting film; and
    the bottom of the translation push base is fixed on a slider block of the second linear sliding table.

3. The conveying apparatus of claim 1, further comprising a driven conveying sub-apparatus including a third movable supporting film, a fourth movable supporting film, a second fixed supporting film and a driven conveying mechanism;
    wherein the third movable supporting film and the fourth movable supporting film are respectively located at both sides of the second fixed supporting film; the third movable supporting film and the fourth movable supporting film are slidably connected with the driven conveying mechanism, so that the driven conveying mechanism drives the third movable supporting film and the fourth movable supporting film to move up and down;
    the driven conveying mechanism is connected with the first lifting push block, the first movable supporting film is connected with the third movable supporting film, the second movable supporting film is connected with the fourth movable supporting film, and the first fixed supporting film is connected with the second fixed supporting film; and
    the third movable supporting film, the fourth movable supporting film and the second fixed supporting film are provided with grooves having sizes matched with the size of the object.

4. The conveying apparatus of claim 3, wherein the driven conveying mechanism includes a second lifting push block, a second lifting wedge block and a second translation slide base;
    wherein the second translation slide base are located below the third movable supporting film and the fourth movable supporting film, and one side of the second translation slide base is fixedly connected with the third movable supporting film, and the opposite side of the second translation slide base is fixedly connected with the fourth movable supporting film;
    the bottom of the second translation slide base is connected with a plane in which a longer straight edge of the second lifting wedge block is located, and a slope of the second lifting wedge block is provided opposite to one side surface of the second lifting push block;
    the second lifting push block is located below the second translation slide base, and the opposite side surface of the second lifting push block is connected with a side of the first lifting push block through a connecting rod; and
    a gradient of the slope of the second lifting wedge block is consistent with a gradient of the slope of the first lifting wedge block, and a height of the slope of the second lifting wedge block is consistent with a height of the slope of the first lifting wedge block.

5. The conveying apparatus of claim 1, wherein the drive conveying mechanism further includes a first guide rail mounting base provided between the first lifting wedge block and the first translation slide base; a bottom of the first guide rail mounting base is in contact with the plane in which the longer straight edge of the first lifting wedge block is located; and
    both ends of the first guide rail mounting base is respectively connected with a first linear guide rail vertically provided; a second linear guide rail is provided at the top of the first guide rail mounting base, and the second linear guide rail is connected with the bottom of the first translation slide base.

6. The conveying apparatus of claim 4, wherein the drive conveying mechanism further includes a first roller provided at the top of the first lifting push block; and
    the driven conveying mechanism further includes a second roller provided at the top of the second lifting push block.

7. The conveying apparatus of claim 4, wherein the driven conveying mechanism further includes a second guide rail mounting base provided between the second lifting wedge block and the second translation slide base; the bottom of the second guide rail mounting base is in contact with the plane in which the longer straight edge of the second lifting wedge block is located; and both ends of the second guide rail mounting base are respectively connected with a third linear guide rail vertically provided; a fourth linear guide rail is provided at a top of the second guide rail mounting base, and the fourth linear guide rail is connected with the second translation slide base.

8. The conveying apparatus of claim 4, wherein the driven conveying mechanism further includes a third guide rail mounting base provided below the second lifting push block, and a fifth linear guide rail is provided at the top of the third guide rail mounting base; and the fifth linear guide rail is connected with the second lifting push block.

9. The conveying apparatus of claim 4, wherein the opposite side surface of the second lifting push block is connected with the connecting rod through a floating joint.

\* \* \* \* \*